Jan. 2, 1934.  G. HATCHER  1,942,245
EGG SEPARATING APPARATUS
Filed June 29, 1933    4 Sheets-Sheet 1
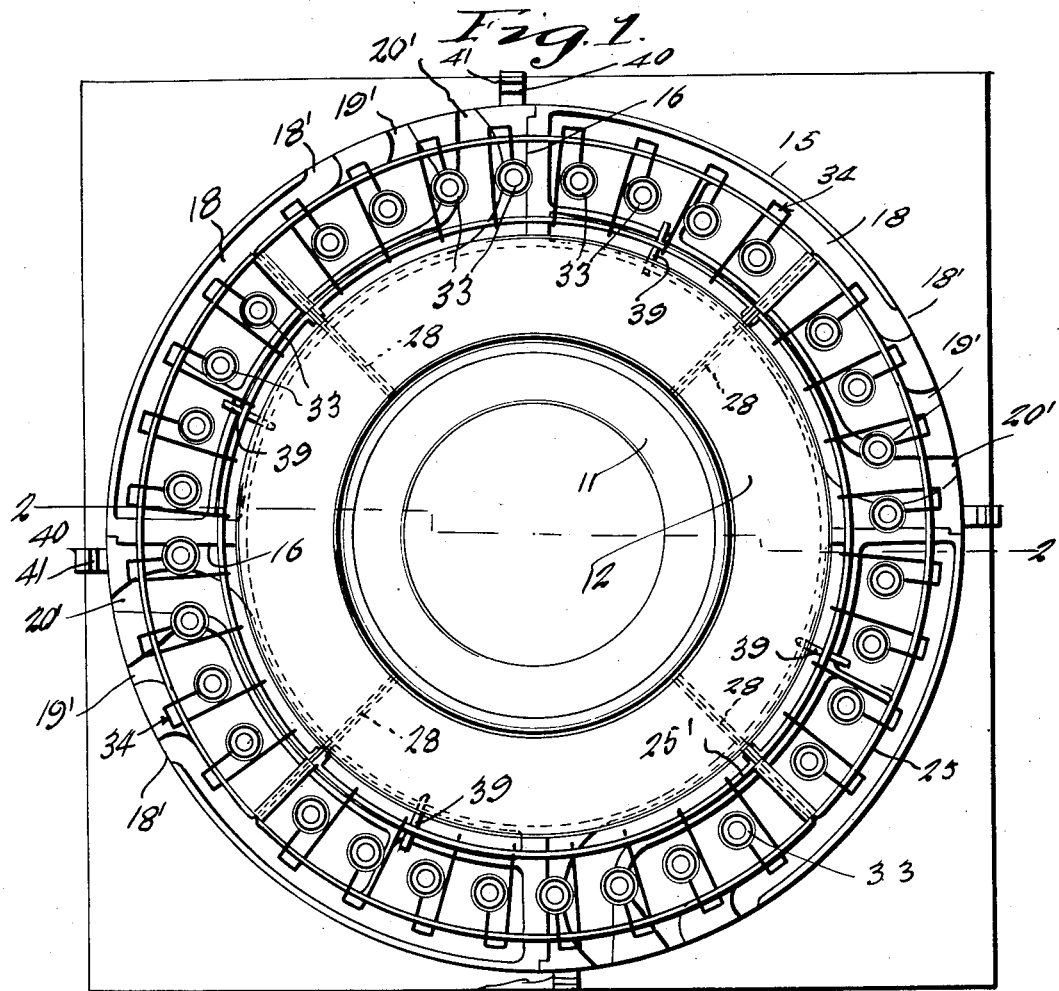
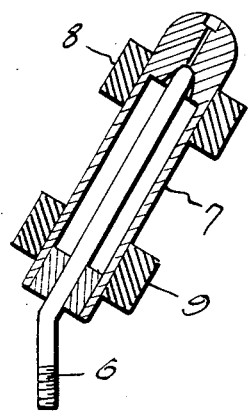
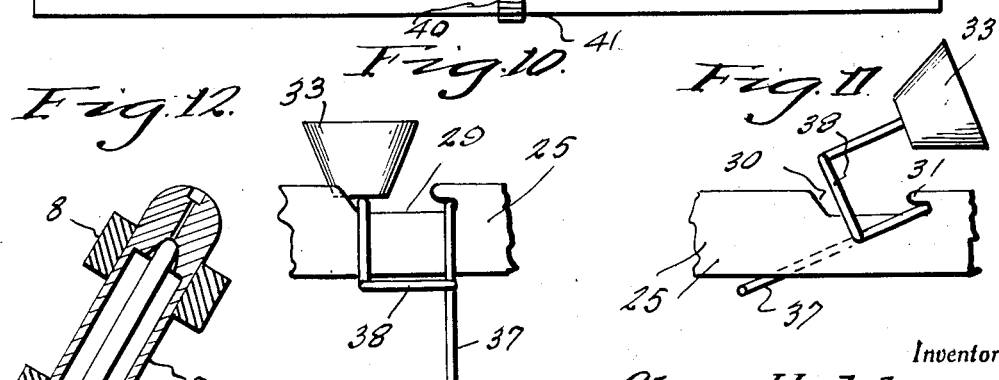
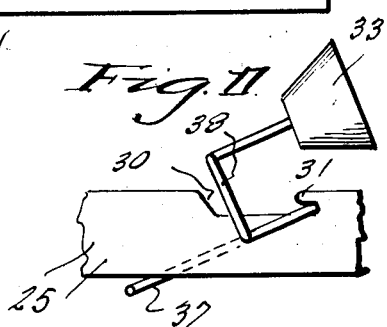
Inventor
Glenn Hatcher
By Clarence A. O'Brien
Attorney Jan. 2, 1934.  G. HATCHER  1,942,245
EGG SEPARATING APPARATUS
Filed June 29, 1933  4 Sheets-Sheet 2
Fig. 2.
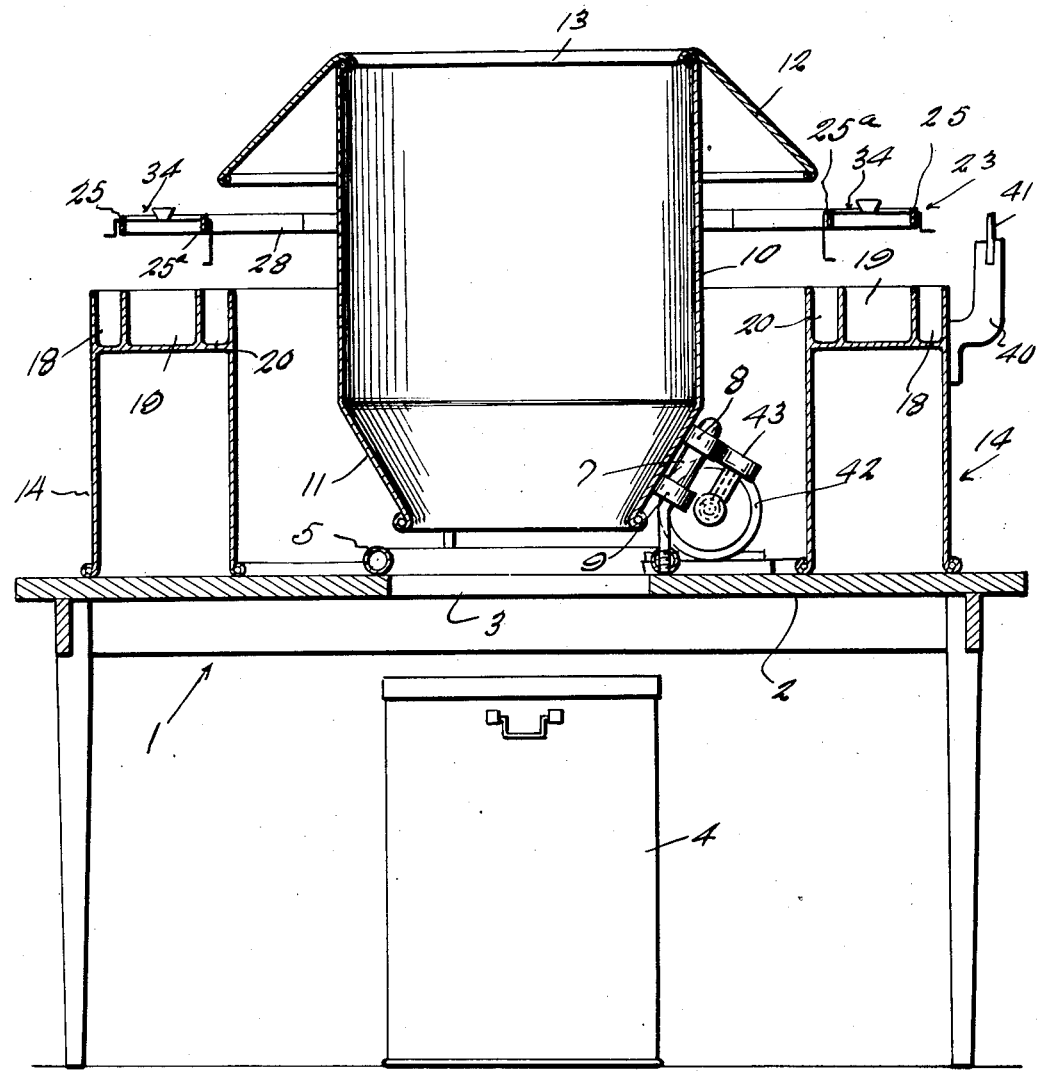
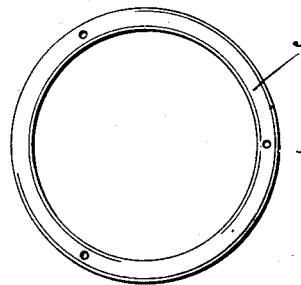
Fig. 17.
Inventor
Glenn Hatcher
By Clarence A. O'Brien
Attorney Jan. 2, 1934. G. HATCHER 1,942,245
EGG SEPARATING APPARATUS
Filed June 29, 1933   4 Sheets-Sheet 3
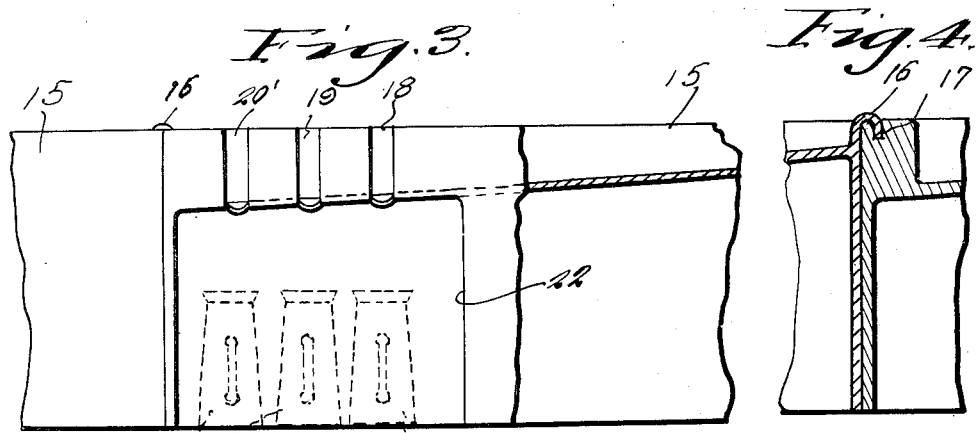
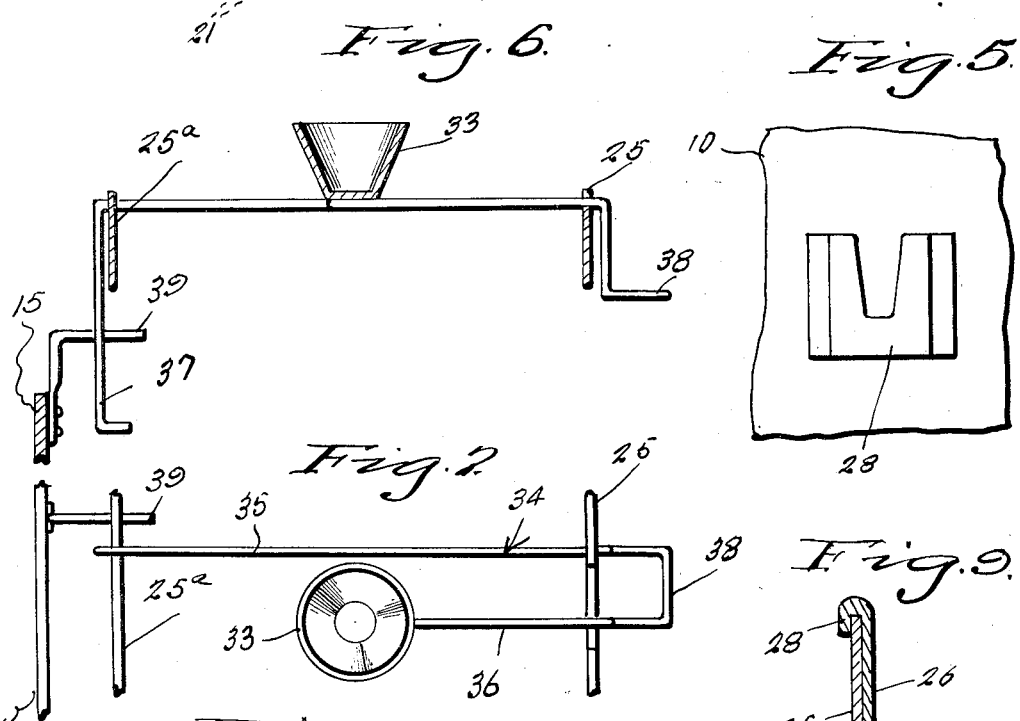
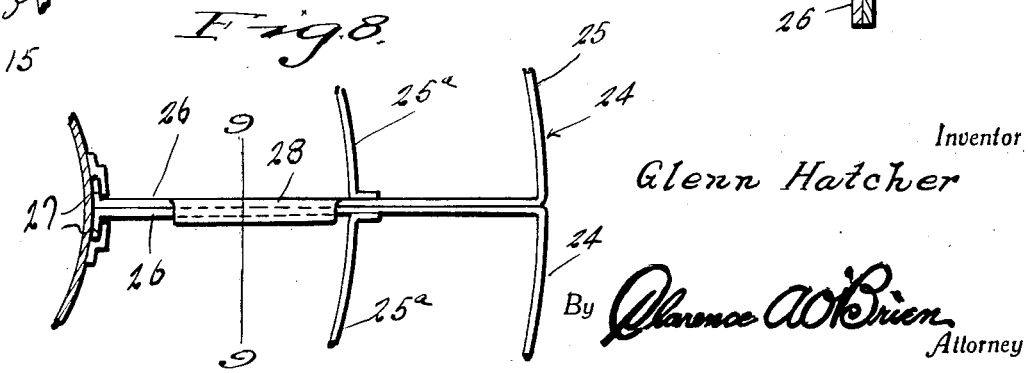
Inventor
Glenn Hatcher
By Clarence A. O'Brien
Attorney

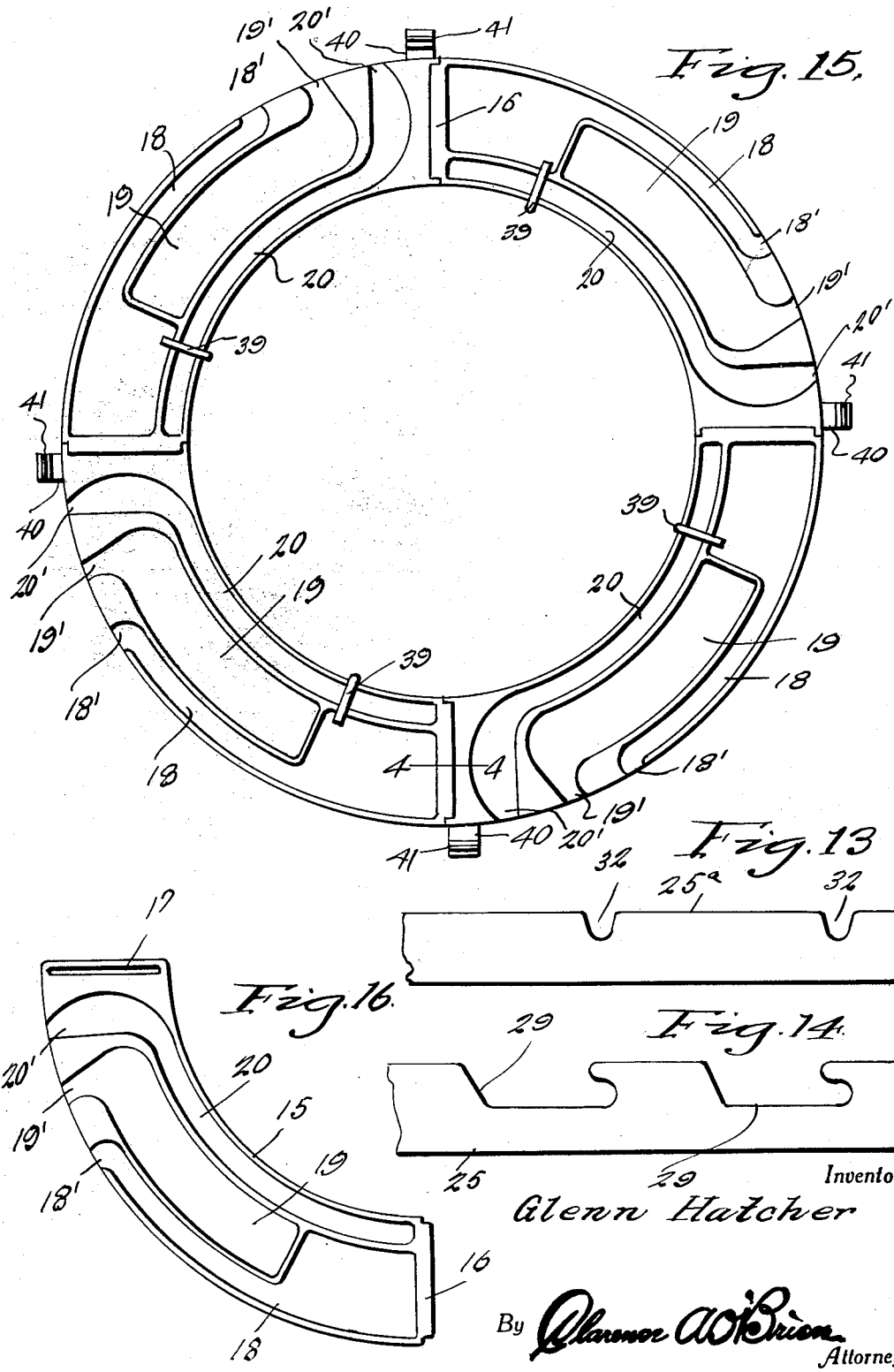

Patented Jan. 2, 1934

1,942,245

UNITED STATES PATENT OFFICE 1,942,245

EGG SEPARATING APPARATUS

Glenn Hatcher, Tulsa, Okla., assignor of one-half to Guaranty Produce Company, Tulsa, Okla.

Application June 29, 1933. Serial No. 678,267

8 Claims. (Cl. 146—2)

This invention relates to apparatus which function to separate the yolks and whites of eggs, and the object of the invention is to provide a machine of the character above mentioned which will accelerate the work of separating whites of eggs from the yolks and to otherwise generally improve upon machines now generally used for this purpose.

One of the objects of the invention is to provide an apparatus of this character which consists of comparatively few parts, can be readily dismantled for cleaning purposes and is otherwise well designed for the purpose intended.

The invention together with its numerous objects and advantages will be best understood from a study of the following description, taken in connection with the accompanying drawings wherein:

Figure 1 is a top plan view of the apparatus.

Figure 2 is a vertical sectional view taken substantially on the line 2—2 of Figure 1.

Figure 3 is a fragmentary elevational view of a portion of a trough, certain parts being broken away and shown in section.

Figure 4 is a detail sectional view taken substantially on the line 4—4 of Figure 15.

Figure 5 is a fragmentary elevational view of a portion of a funnel having a bracket mounted thereon to be hereinafter more fully referred to.

Figure 6 is a detail sectional elevational view of a cup and supporting means therefor.

Figure 7 is a top plan view of the assembly shown in Figure 6.

Figure 8 is a fragmentary plan view showing the manner of supporting a tray structure to be hereinafter more fully referred to.

Figure 9 is a sectional view taken substantially on the line 9—9 of Figure 8.

Figure 10 is an elevational view illustrating the manner of engaging a cup bracket with the tray hereinbefore referred to.

Figure 11 is a view similar to Figure 10 showing the position of the cup and its bracket subsequent to a tripping thereof.

Figure 12 is a sectional view through a roller to be hereinafter more fully referred to.

Figure 13 is an elevational view of one side of a section forming part of the tray hereinbefore referred to.

Figure 14 is a similar view of a second side of the section of said tray.

Figure 15 is a plan view of a trough and

Figure 16 is a plan view of a section of the trough shown in Figure 15.

Figure 17 is a plan view of the supporting ring to be hereinafter more fully referred to.

Referring to the drawings by reference numerals it will be seen that 1 indicates generally a table having in the present instance a top 2 provided with a centrally located opening 3.

In accordance with the present invention there is arranged beneath the top 2 in line with the opening 3 a receptacle 4 for receiving the shells of broken eggs and also such eggs as are unfit for use.

Suitably mounted on the table top 2 about the opening 3 is a tubular ring 5 that has threadedly engaged therewith the lower ends of a plurality of posts 6. These posts 6 are in the present instance three in number and each has mounted thereon a roller in the form of a substantially cylindrical core 7 provided with spaced rings 8, 9 of rubber or other suitable resilient material. It will be noted from a study of Figure 12, the upper ends of the posts 6 are disposed at an angle to the perpendicular and support on the angularly disposed ends thereof the rollers 7.

Supported by the rollers 7 in line with the opening 3 is a funnel 10 that includes a cylindrical body provided with a frustro conical bottom portion 11 that engages the rings 8, 9 of the rollers in the manner clearly suggested in Figure 2. For the upper end of the funnel 10 there is provided a drip shield 12, the same being in the present instance, in the nature of a frustroconical ring that is provided at its smallest end with a flange 13 turned thereon to engage the upper edge of the body 10 of the funnel shown in Figure 2.

Also arranged on the table top 2 concentric to the opening 3 is a trough 14. Trough 14 comprises a series of segmental sections 15 respectively provided at one end with a downturned flange or lug 16 and at a relatively opposite end with a slot 17 to receive the lug on the adjacent end of the next preceding section as will be clear from a study of Figures 4, 15 and 16.

Each trough section 15 is divided by suitable partitions into a channel 18 for receiving the yolk of an egg, a channel 19 for receiving the white of an egg, and the channel 20 for receiving the yolk and white of an egg, the yolk of which has become broken. The channels 18, 19 and 20 open at the outer side of the trough as at 18', 19' and 20' for discharging the contents thereof into cans or suitable receptacles 21 suitably arranged in position to the discharge ends 18', 19', and 20' of the channels as will be clear from a study of Figure 3. As shown in Figure 3 the outer sides of the trough sections are recessed as at 22 to accommodate the cans 21, while the bottoms of the channels 18, 19 and 20 are inclined, and slope toward their respective outlets 18', 19' and 20'.

Supported above the trough 14 and revoluble with the funnel 10 is a tray 23 which in the present instance is circular and is composed of a plurality of sections; and each section 24 is of arcuate form and consists of metal straps bent into the shape of an arcuate frame with the ends of the straps suitably united at the ends of the frame, and end portions 26 of the straps extending inwardly and forming arms having ends 27 formed to engage in a suitable bracket 28 provided therefor on the wall of the cylindrical section of funnel 10. In this connection it will be noted that corresponding ends of adjacent sections 25 are arranged in abutting relation and that the arm 26 of each alternate tray has on its upper edge a flange 28 turned thereon to engage over the upper edge of the arm 26 of an adjacent tray in a manner clear from a study of Figures 8 and 9. It will thus be seen that the tray 23 is supported from the funnel 10 concentric to the funnel and in a manner to revolve therewith.

Each tray section 24 has the outer side 25 thereof provided with a series of relatively spaced notches 29 of the shape shown in Figures 10 and 11, wherein it will be seen each notch 29 has a flat bottom wall, an inclined wall 30 and a lip or lug 31 on the opposite end wall overlying the bottom wall of the slot.

Each inner side 25a of each tray section 24 is provided with V-shaped notches 32 arranged in operative position to the notches 29.

For removable disposition on the tray 23 there are provided a suitable number of cups 33. Each cup 33 has a supporting and handling frame associated therewith, and said supporting and handling frame designated by the reference numeral 34 is formed from a single length of wire. The wire of each supporting frame is bent into a substantial U to provide a relatively elongated leg 35, a relatively shorter leg 36 a depending lever 37 on the free end of the longer leg 35 and an angular end portion 38 at the closed end of the U connecting the legs 35, 36. The cup 33 is secured to the free end of the shorter leg 36 in any suitable manner.

As thought clear from the above each tray section 24 is adapted to accommodate a suitable number of cups 33 and their associated parts, and in this connection it will be noted that the legs 35, 36 of the supporting and handling frames 34 of each cup at their corresponding ends are adapted to be sprung into a notch 29 on the outer side of the tray section while the leg 34 at the lever equipped end 37 thereof is adapted to engage in a notch 32 provided in the inner side of the tray section. As will be clear from a study of Figure 10 the legs 35, 36 are sprung into engagement with the notch 29 and the leg 35 engages under the lug or lip 31 so as to retain the cup and its supporting and handling frame against casual displacement.

Each tray section 15 as clearly shown in Figure 15 is provided on the inner side thereof with a properly arranged trip arm 39 which is disposed in the path of the levers 37 for successively engaging the levers 37 during a revolving of the tray and thereby cause the handling and supporting frames 34 of the cups to be tilted to the position shown in Figure 11 for emptying the contents of the cups successively into the yoke channel 18.

To facilitate the breaking of the egg each of the trough sections 15 at its outer side, and adjacent one end thereof is provided with what may be termed an egg breaking device, the same including an angular bracket 40 provided at its upper end with a vertical blade 41 against the upper edge of which the shell of the egg is struck for breaking the shell in a manner thought apparent to those skilled in the art.

It will be noted that in the present instance there are four egg breaking devices of the type above described and in the contemplated use of this apparatus four persons can be employed at the same time for the purpose of separating the yolk and white of the eggs thus permitting a considerable amount of work to be done in a short time and with a minimum amount of labor.

For revolving the funnel 10 and the tray 23 associated therewith there is provided a suitable electric motor 42 arranged adjacent one of the posts 6 and provided with suitable means for driving a wheel or roll 43 that is in frictional contact with the periphery of the roll 8 on an adjacent roller 7 to thereby transmit movement of the roll 43 to the funnel 10 for revolving the same.

It is thought that the operation of the device will be clear to those skilled in the art from the foregoing description. However the operation may be briefly described as follows:

In the present instance a person is stationed adjacent each of the egg breaking devices 40, 41. The circuit to the motor 42 is closed for revolving the funnel 10 and tray 23 associated with the funnel. The egg breaker will take an egg, crack the same and deposit the yolk in a cup 33 which is designed to just hold the yolk. The albumen or white of the deposited egg will overflow the cup 23 into the channel 19 of the trough section 16 over which the cup is passing. At about the time the cup 33 moving with the tray 23 approaches the closed end of the channel 19 practically all of the white will have drained from the cup. At this point the lever 37 associated with the supporting and handling frame 34 of the cup moves into engagement with a trip arm 39 thus causing the member 34 and the cup associated therewith to be tripped from the position shown in Figure 10 to the position shown in Figure 11 with the result that the yolk of the egg will drain from the cup into the yolk channel 18 of the said trough section 15. The egg breaker then manipulates the frame 34 to return the frame and the cup associated therewith to the position shown in Figure 10, in which position the cup is in readiness to receive the yolk of an egg broken by the next succeeding egg breaker. It will be apparent, that the egg breaker will be required to work quickly without undue haste in order to keep up with the passing cup as each cup requires to be filled.

As each egg is broken the shell thereof is tossed into the funnel 10 and passes down through the funnel, the opening 3 in the top of the table 1 and into the refuse receptacle 4.

In the event the yolk becomes broken when being placed in a cup 33 the operator may quickly disengage the frame 34 associated with the cup from its tray section 15 and pour the contents of the cup into the channel 20 of a trough section 15.

As is obvious, during the operation of the device the channels 18, 19 and 20 of each section will drain into the cans or receptacles 21 so that there is little or no danger of the channels overflowing.

Having thus described my invention, what I claim as new is:

1. A liquid egg separating apparatus comprising a fixed trough provided with a channel for receiving the white and yolk of an egg, a second channel for receiving the white of an egg, and a third channel for receiving the yolk of an egg, a tray mounted above the trough for movement relative thereto, and a white and yolk separating device mounted on the tray and positionable by the movement of the tray to discharge successively the white into its respective channel, and the yolk into its respective channel.

2. A liquid egg separating apparatus comprising a trough comprising a plurality of fixed sections respectively having three channels therein, one for receiving the white and yolk of an egg, a second channel for receiving the white of the egg, and the third channel for receiving the yolk of the egg, a tray mounted above the trough and movable relative to the trough in a plane parallel thereto, a plurality of cup carriers removably mounted on the tray, and cups on said carriers.

3. A liquid egg separating apparatus comprising a fixed annular trough provided with channels for receiving respectively the white and yolks, the whites, and the yolks separated from the white, an annular tray mounted above said trough for movement relative thereto, supporting means for said tray including means for revolving it, a series of individual cup supporting and handling devices removably mounted on said tray, cups carried by said devices, said cups being arranged relative to the trough for discharging the contents thereof into the yolk receiving channel as they approach one end of said channel, and means for automatically tilting the cup handling and supporting devices successively as they approach said one end of the yolk receiving channel.

4. A liquid egg separating device comprising in combination a support having an aperture, a funnel revolubly mounted in a vertical position above the support in line with said aperture, means for supporting said funnel including means for revolving it, a fixed trough mounted on the support concentric to said funnel, a tray mounted on the funnel above said trough and revoluble with the funnel, and a series of white and yolk separating cups mounted on the tray and positioned relative to the trough to discharge their contents into said trough.

5. In a liquid egg separating apparatus, the combination with a support, an annular trough mounted on said support, a substantially cylindrical member mounted vertically on the support concentric to the trough, means for supporting said substantially cylindrical member including means for revolving it, a tray mounted on said substantially cylindrical member and overlying said trough, said tray having inner and outer spaced concentric sides, a plurality of relatively spaced cup supporting and handling devices mounted on the tray and bridging the space between the sides of the tray, and cups mounted on the last named devices and positioned relative to the trough to discharge their contents into said trough.

6. In a liquid egg separating apparatus, the combination with a support, an annular trough mounted on said support, a substantially cylindrical member mounted vertically on the support concentric to the trough, means for supporting said substantially cylindrical member including means for revolving it, a tray mounted on said substantially cylindrical member and overlying said trough, said tray having inner and outer spaced concentric sides, a plurality of relatively spaced cup supporting and handling devices mounted on the tray and bridging the space between the sides of the tray, and cups mounted on the last named devices and positioned relative to the trough to discharge their contents into said trough, said trough being divided into a plurality of sections, and each section including a channel for receiving the white and yolk from a cup, a second channel for receiving the white overflowing a cup, and a third channel for receiving the yolk from the same cup.

7. In a liquid egg separating apparatus, the combination with a support, an annular trough mounted on said support, a substantially cylindrical member mounted vertically on the support concentric to the trough, means for supporting said substantially cylindrical member including means for revolving it, a tray mounted on said substantially cylindrical member and overlying said trough, said tray having inner and outer spaced concentric sides, a plurality of relatively spaced cup supporting and handling devices mounted on the tray and bridging the space between the sides of the tray, and cups mounted on the last named devices and positioned relative to the trough to discharge their contents into said trough, said trough being divided into a plurality of sections, and each section including a channel for receiving the white and yolk from a cup, a second channel for receiving the white overflowing a cup, and a third channel for receiving the yolk from the same cup, and interengaging means on said trough and the respective cup supporting and handling devices for successively tilting the cups as the cups approach one end of the channel designed for receiving the yolk.

8. In a liquid egg separating apparatus, the combination with a support, an annular trough mounted on said support, a substantially cylindrical member mounted vertically on the support concentric to the trough, means for supporting said substantially cylindrical member including means for revolving it, a tray mounted on said substantially cylindrical member and overlying said trough, said tray having inner and outer spaced concentric sides, a plurality of relatively spaced cup supporting and handling devices mounted on the tray and bridging the space between the sides of the tray, and cups mounted on the last named devices and positioned relative to the trough to discharge their contents into said trough, said trough being divided into a plurality of sections, and each section including a channel for receiving the white and yolk from a cup, a second channel for receiving the white overflowing a cup, and a third channel for receiving the yolk from the same cup, and interengaging means on said trough and the respective cup supporting and handling devices for successively tilting the cups as the cups approach one end of the channel designed for receiving the yolk, said tray being also provided with a series of notches, and said cup handling and supporting devices having parts thereof adapted to spring into engagement with said notches for releasably retaining said devices on said tray.

GLENN HATCHER.